(12) United States Patent
Terada et al.

(10) Patent No.: US 11,050,771 B2
(45) Date of Patent: Jun. 29, 2021

(54) INFORMATION PROCESSING APPARATUS, COMMUNICATION INSPECTING METHOD AND MEDIUM

(71) Applicant: PFU LIMITED, Kahoku (JP)

(72) Inventors: Seigo Terada, Kahoku (JP); Keiji Michine, Kahoku (JP); Takashi Kobayashi, Kahoku (JP)

(73) Assignee: PFU LIMITED, Ishikawa (JP)

( * ) Notice: Subject to any disclaimer, the term of this patent is extended or adjusted under 35 U.S.C. 154(b) by 326 days.

(21) Appl. No.: 16/161,408

(22) Filed: Oct. 16, 2018

(65) Prior Publication Data

US 2020/0021608 A1 Jan. 16, 2020

(30) Foreign Application Priority Data

Jul. 13, 2018 (JP) .............................. JP2018-133547

(51) Int. Cl.
*H04L 29/06* (2006.01)
*G06F 17/18* (2006.01)
*G06F 21/57* (2013.01)

(52) U.S. Cl.
CPC .......... *H04L 63/1425* (2013.01); *G06F 17/18* (2013.01); *G06F 21/57* (2013.01); *H04L 63/0245* (2013.01); *H04L 63/1416* (2013.01); *H04L 69/22* (2013.01)

(58) Field of Classification Search
CPC ..... G06F 17/18; G06F 21/57; H04L 63/1425; H04L 63/0245; H04L 63/1416; H04L 69/22

USPC ......................................................... 726/23
See application file for complete search history.

(56) References Cited

U.S. PATENT DOCUMENTS

| | | | | |
|---|---|---|---|---|
| 7,467,408 | B1 * | 12/2008 | O'Toole, Jr. | .......... H04L 63/145 726/13 |
| 9,166,994 | B2 * | 10/2015 | Ward | .................. H04L 63/1425 |
| 2017/0155642 | A1 | 6/2017 | Kobayashi et al. | |

FOREIGN PATENT DOCUMENTS

| JP | 2017-98876 A | 6/2017 |
|---|---|---|
| WO | 2017/145843 A1 | 8/2017 |

* cited by examiner

*Primary Examiner* — Michael S McNally
(74) *Attorney, Agent, or Firm* — Westerman, Hattori, Daniels & Adrian, LLP

(57) ABSTRACT

To detect a communication by a predetermined type of software, which disguises normal communication, an information processing apparatus includes: a communication data acquiring unit 21 configured to acquire communication data generated by a terminal connected to a network; a distribution calculating unit 24 configured to calculate distribution of attribute information of a plurality of communications with a same communication destination, based on the acquired communication data; and an estimating unit 25 configured to estimate whether a detected communication is a communication by a predetermined type of software by determining whether the calculated distribution satisfies a predetermined criterion.

15 Claims, 9 Drawing Sheets

INFORMATION PROCESSING APPARATUS, COMMUNICATION INSPECTING METHOD AND MEDIUM

CROSS-REFERENCE TO RELATED APPLICATION

This application is based upon and claims the benefit of priority of the prior Japanese Patent Application No. JP2018-133547, filed on Jul. 13, 2018, the entire contents of which are incorporated herein by reference.

FIELD

The present disclosure relates to a technique to inspect communication on a network.

BACKGROUND

A conventionally proposed technique is such that: the access data collected at a plurality of observation points is classified for each detection target access source; a network feature value is generated for each detection target access source; an access source detecting unit detects an access source which performs predetermined continuous access based on the network feature value; a point feature value generating unit generates a detection target point feature value which is a feature value for each access data collected at a single observation point, and a teacher point feature value which is a feature value for each access data of the access source detected by the access source detecting unit; and an access detecting unit detects, as the access data by the predetermined continuous access, an access data of which similarity of the detection target point feature value with the teacher point feature value is at least a predetermined value (see WO 2017/145843).

It is also proposed that the communication of malware using an unauthorized certificate by inspecting a digital certificate (see Japanese Patent Application Publication No. 2017-98876) and that the appearance frequency of the type of Hypertext Transfer Protocol (HTTP) header based on the bag-of-words (appearance frequency of words) model is used as a feature of C&C communication (see Hideki Ogawa et al, "Malware originated HTTP traffic detection utilizing cluster appearance ratio", International Conference on Information Networking (ICOIN) Jan. 11, 2017).

SUMMARY

To detect communication by a predetermined type of software (e.g. malware), a technique to detect a threat to a system by signature collation, and a technique to detect a threat to a system by determining suspicious behavior of a terminal on a network, have been used.

Recently, however, malware that performs C&C communication based on HTTP that is disguised as browser communication, and C&C communication based on Secure Socket Layer/Transport Layer Security (SSL/TLS) using a valid SSL server certificate is rapidly increasing, and communication performed by malware has started to sophisticatedly disguise normal communication (e.g. regular business communication). Therefore, it is difficult to discern between business communication and malware communication by the above-mentioned prior art.

With the foregoing problem in view, it is an object of the present disclosure to detect a communication by a predetermined type of software, which disguises normal communication.

An example of the present disclosure is an information processing apparatus comprising: a communication data acquiring unit configured to acquire communication data generated by a terminal connected to a network; a distribution calculating unit configured to calculate distribution of attribute information of a plurality of communications with a same communication destination, based on the acquired communication data; and an estimating unit configured to estimate whether a detected communication is a communication by a predetermined type of software by determining whether the calculated distribution satisfies a predetermined criterion.

The present disclosure can be regarded as a method executed by the information processing apparatus, system or computer, or a program that causes a computer to execute the method. The present disclosure can also be regarded as a storage medium storing the program which can be read by computers or other apparatuses and machines. Here the recording medium that computers or the like can read refers to a storage medium that stores data, program or other information electrically, magnetically, optically, mechanically or chemically, and can be read by a computer or the like.

According to the present disclosure, a communication by a predetermined type of software, which disguises normal communication, can be detected.

DESCRIPTION OF EMBODIMENTS

Embodiments of an information processing apparatus, a communication inspecting method and a program according to the present disclosure will be described with reference to the drawings. The embodiments described below, however, are merely examples of the embodiments of this disclosure, and are not intended to limit the information processing apparatus, the communication inspecting method, and the program, according to the present disclosure, to the following specific configurations. To carry out the present disclosure, an appropriate configuration in accordance with each embodiment may be used, and various improvements and modifications may be performed.

An example described in this embodiment is the information processing apparatus, the communication inspecting method and the program according to the present disclosure, which are applied to a system configured to detect an unauthorized activity on the network, and perform countermeasures, such as shutting down communication and notifying an alert. The information processing apparatus, the communication inspecting method and the program according to the present disclosure, however, can be widely used to inspect communication over networks, and the application target of the present disclosure is not limited to the example to be described in this embodiment.

System Configuration

Figure 1:
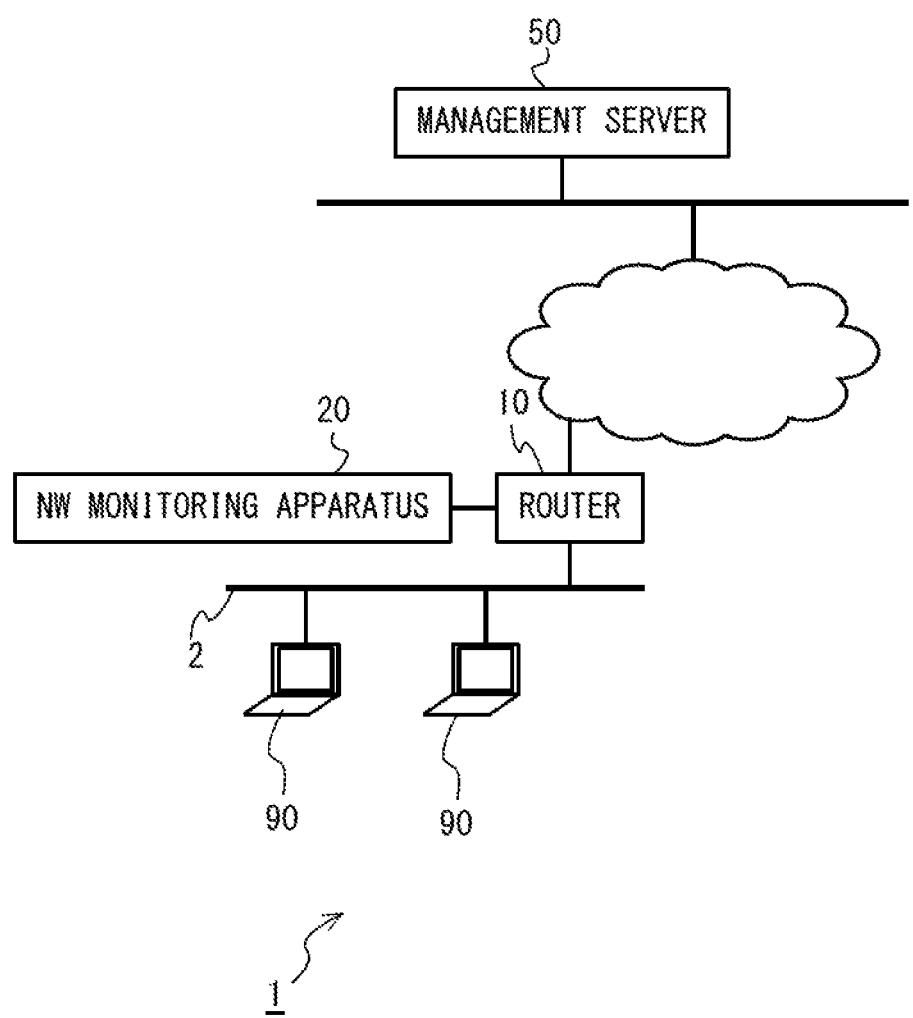
FIG. 1 is a schematic diagram depicting a configuration of a system according to an embodiment.

FIG. 1 is a schematic diagram depicting a configuration of a system 1 according to this embodiment. The system 1 according to this embodiment has: a network segment 2 to which a plurality of information processing terminals 90 (hereafter called "nodes 90") are connected; a network monitoring apparatus 20 (communication monitoring apparatus) configured to monitor the communication related to the nodes 90; and a management server 50 which is communicably connected with the network segment 2 via a router 10.

In this embodiment, the network monitoring apparatus 20 is connected to a monitoring port (mirror port) of a switch or a router (router in the example in FIG. 1), so as to acquire communication data (e.g. packets, frames) which are transmitted/received by the nodes 90, and transmit the acquired communication data to the management server 50. In this case, the network monitoring apparatus 20 may operate in a passive mode, in which acquired packets are not transferred.

The management server 50 collects information from the network monitoring apparatus 20, and manages the network monitoring apparatus 20. In the external network, a quarantine server may be disposed to provide a quarantine service to the nodes 90 connected to the network segment 2, or a business server may be disposed to provide a service for business to the nodes 90 (illustrations of these servers are omitted).

In the system 1 according to this embodiment, various servers to which the nodes 90 are connected are connected in remote areas via the Internet or a wide area network, and are provided by the application service provider (ASP), but these servers need not always be connected in a remote area. For example, these servers may be connected via a local area network where the nodes 90 and the network monitoring apparatus 20 exist.

Figure 2:
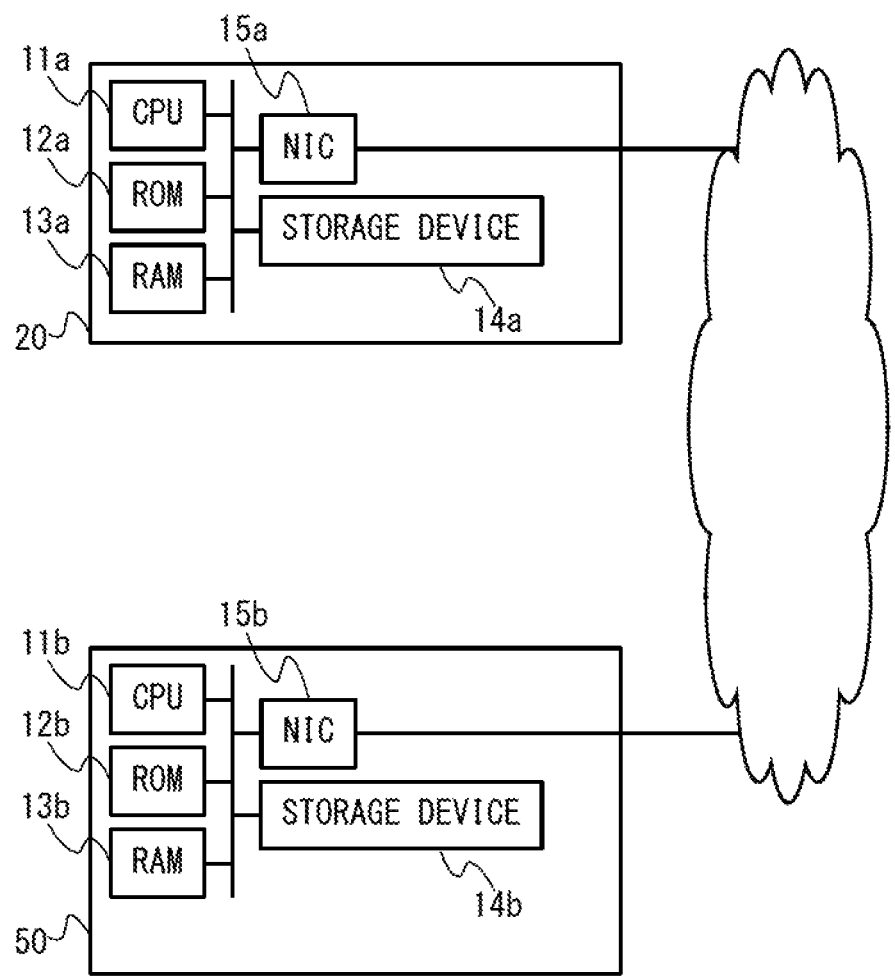
FIG. 2 is a diagram depicting a hardware configuration of a network monitoring apparatus and a management server according to the embodiment.

FIG. 2 is a diagram depicting a hardware configuration of the network monitoring apparatus 20 and the management server 50 according to this embodiment. In FIG. 2, illustrations of configurations other than the network monitoring apparatus 20 and the management server 50, such as the router 10 and the nodes 90, are omitted. Each of the network monitoring apparatus 20 and management server 50 is a computer, which includes: a central processing unit (CPU) 11a and 11b; storage devices 14a and 14b, such as a random access memory (RAM) 13a, 13b, a read only memory (ROM) 12a, 12b, an electrically erasable programmable read only memory (EEPROM) and a hard disk drive (HDD); and a communication unit, such as network interface card (NIC) 15a and 15b.

Figure 3:
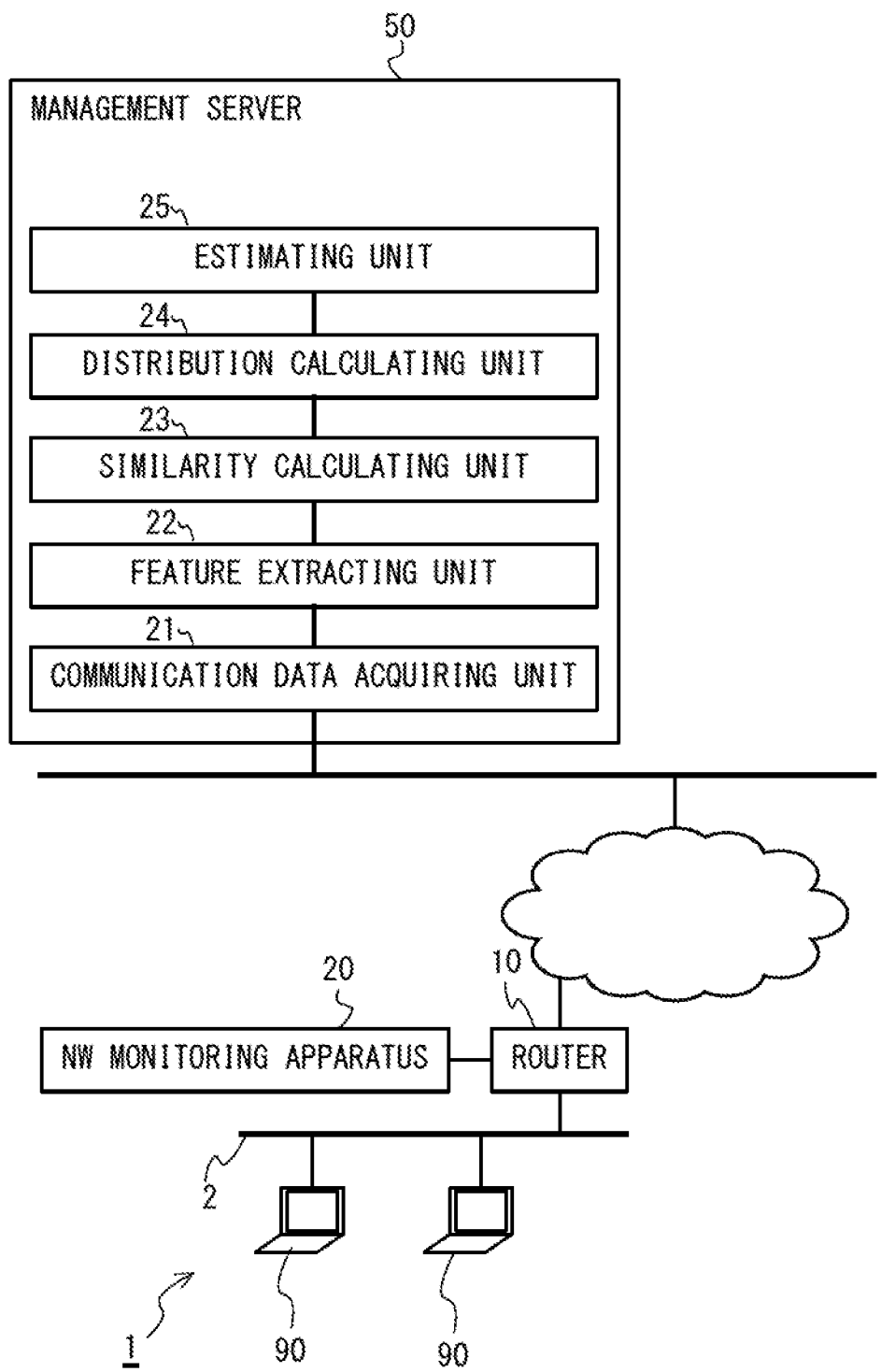
FIG. 3 is a diagram depicting a general functional configuration of the management server according to the embodiment.

FIG. 3 is a diagram depicting a general functional configuration of the management server 50 according to this embodiment. The management server 50 functions as an information processing apparatus constituted of a communication data acquiring unit 21, a feature extracting unit 22, a similarity calculating unit 23, a distribution calculating unit 24 and an estimating unit 25, by a program recorded in the storage device 14b that is loaded to the RAM 13b and executed by the CPU 11b, so as to control each hardware of the management server 50. In this embodiment and in the later mentioned other embodiments, each function of the management server 50 is executed by the CPU 11b, which is a general purpose processor, but a part or all of these functions may be executed by one or a plurality of dedicated processors.

In the description of this embodiment, the information processing apparatus according to the present disclosure is the management server 50, but a part or all of the above-mentioned functions of the information processing apparatus according to the present disclosure may be disposed on the network monitoring apparatus 20. If a part or all of the above-mentioned functions are disposed on the network monitoring apparatus 20, the network monitoring apparatus 20 functions as an information processing apparatus having a part or all of the above-mentioned functions, by a program recorded in the storage device 14a that is loaded to the RAM 13a and executed by the CPU 11a.

The communication data acquiring unit 21 acquires communication data that is captured by the network monitoring apparatus 20 disposed on the monitoring target network, and transmitted to the management server 50. This communication data is the communication data of the communication performed by a node 90 connected to the monitoring target network.

For each element (determination point) included in the communication, the feature extracting unit 22 generates feature data of the target communication by extracting features from the communication data acquired by the communication data acquiring unit 21 using a feature extracting method set in advance, so as to generate the feature data of the target communication. The extracted feature is the content of the request header, for example, in the case of HTTP communication, and is the parameter values included in the handshake of the transaction, for example, in the case of SSL/TLS (HTTPS) communication. In this embodiment, the feature extracting unit 22 also extracts the arrangement order of the request headers included in a plurality of communications as a feature of the communication.

For each element included in the communication, the similarity calculating unit 23 compares the feature data extracted for the target communication with the feature data of other communication, and calculates the element similarity. To calculate the element similarity, it is preferable to use an appropriate similarity calculating method for each type of parameter of the element. In concrete terms, the similarity calculating unit 23 calculates the element similarity based on the commonality of the features related to the element (e.g. Jacarrd coefficient), a distance between combinations of the features related to the element (e.g. Damerau-Levenshtein distance) and the like. To calculate the element similarity, other distance similarity methods may be used.

The similarity calculating unit 23 calculates the total similarity between communications by weighting each calculated element similarity for each element. The total similarity, however, is not limited to the example described in this embodiment, as long as it is calculated with the element similarity, which is calculated with reflecting the weight assigned to each element. Further, the total similarity is not limited to being expressed by a single index, but may be expressed by a combination of a plurality of indices.

When at least a predetermined number of communications with a same communication destination, of which similarity is at least a predetermined value, are detected, the distribution calculating unit 24 calculates a distribution of attribute information of the plurality of communications related to the same communication destination, based on the acquired communication data. Here, as the distribution of the attribute information, the distribution calculating unit 24 calculates at least one of the regularity of the communication timing (e.g. data request transmission interval to a single destination), and the bias of the communication data size (e.g. data length related to response to a single destination).

In this embodiment, the distribution calculating unit 24 calculates the distribution of the attribute information on a communication, excluding communication of which the communication timing or the data size is outside a predetermined range, out of a plurality of communications. This processing is for excluding outliers in the communication timings and data sizes, which become noise (garbage), to determine whether the communication is a predetermined type.

In this embodiment, as examples of the distribution of attribute information of a plurality of communications, the regularity of communication timing and the bias of communication data size were described, but the attribute information for which distribution is calculated is not limited to the examples of the present disclosure. As long as the distribution to be calculated is attribute information that is useful to estimate the relevance of a plurality of communications, other attribute information may be used to calculate the distribution.

The estimating unit 25 refers to the result of processing by the distribution calculating unit 24, and determines whether the calculated distribution satisfies a predetermined criterion (e.g. whether the calculated distribution has at least a predetermined value of regularity or has at least a predetermined bias), so as to estimate whether the detected communication is communication by malware. In this embodiment in particular, the estimating unit 25 estimates whether the detected communication is the communication of a C&C communication phase by malware by determining whether the calculated distribution satisfies the determination criterion provided for the C&C communication phase of malware communication. The phase of malware communication to be detected is not limited to C&C communication. By performing this estimation, the detected communication and terminal can be classified (mapped) to any phase of malware activity, and this information can be used to assist to take effective countermeasures.

Further, when the similarity between a first communication performed by a first terminal and a second communication performed by a second terminal, calculated by the similarity calculating unit 23, is at least a predetermined value, the estimating unit 25 estimates that the second terminal is a terminal where software, belonging to the same group as the software of the first communication, is running. Thereby when a terminal performing communication of which similarity is at least the predetermined value exists on the same network, this terminal can be estimated as an infected terminal by the same or similar malware.

If it is detected that at least a predetermined ratio of communications, with respect to the total number of monitoring target hosts, is detected as malware communication, it is highly possible that an over detection occurred (communication by normal business software (not malware) was erroneously detected as malware communication). Therefore according to this embodiment, if a ratio of the number of terminals which perform communication, of which similarity to the first communication is at least a predetermined value, with respect to the number of terminals (monitoring target hosts) managed by this information processing apparatus, is at least a predetermined ratio (e.g. 0.1%), the estimating unit 25 negates the estimation that the first communication is a malware communication.

Further, if the similarity between the first communication and a known communication calculated by the similarity calculating unit 23 is at least a predetermined value, the estimating unit 25 estimates the first communication as communication by a malware, which belongs to a same group (e.g. known malware family) as the malware that performs the known communication.

Processing Flow

A processing flow executed by the management server 50 according to this embodiment will be described next. The specific content and processing sequence of the processing to be described hereinbelow are an example to carry out the present disclosure. The specific processing content and processing sequence may be appropriately selected in accordance with the embodiment of the present disclosure.

Figure 4:
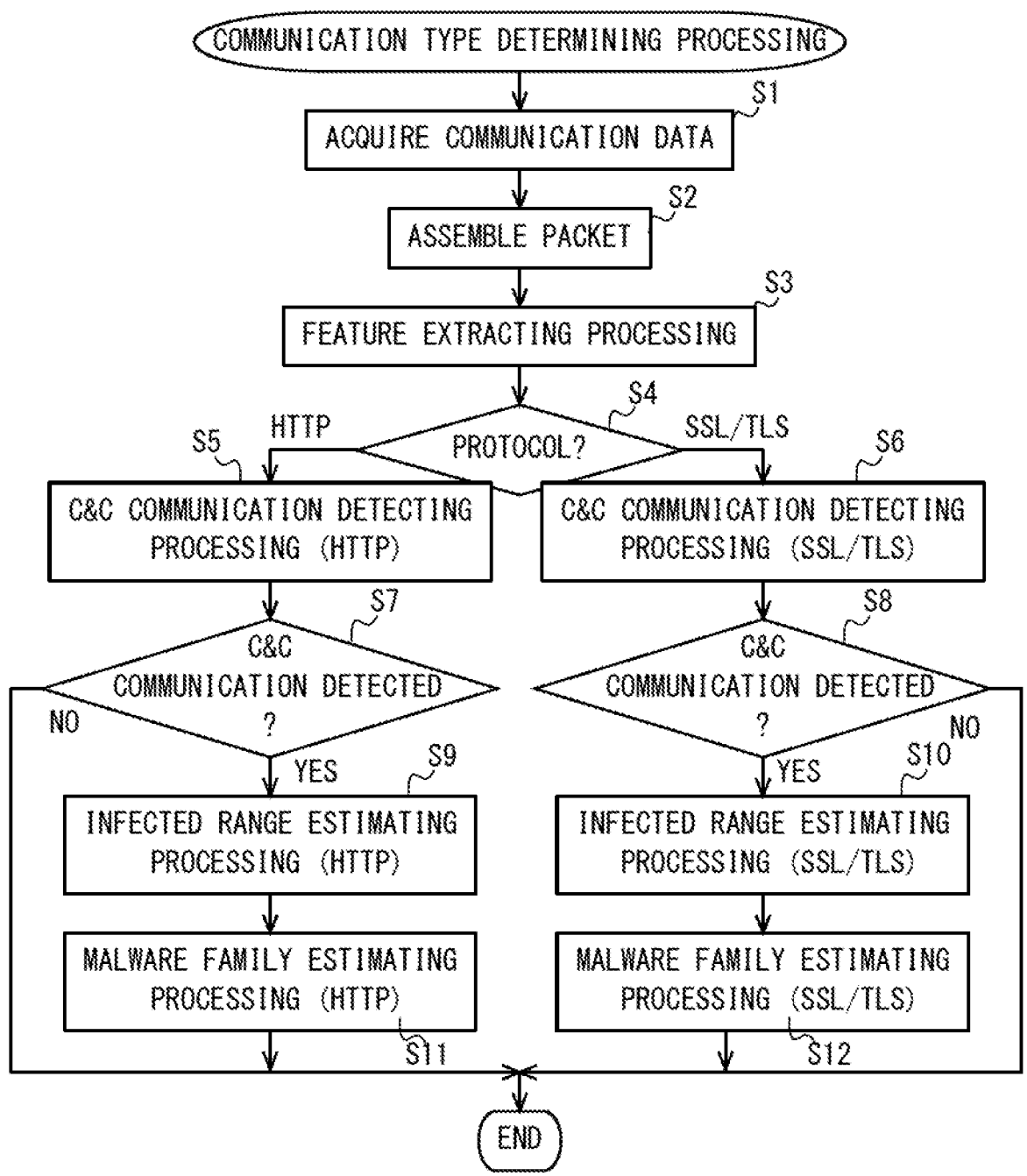
FIG. 4 is a flow chart depicting a general flow of a communication inspecting processing according to the embodiment.

FIG. 4 is a flow chart depicting a general flow of the communication inspecting processing according to this embodiment. The processing in this flow chart is started when the communication data of the communication by the node 90 is received by the network monitoring apparatus 20, and is input to the management server 50.

In step S1 to step S3, the communication data is acquired, and the features of the communication are extracted. The communication data acquiring unit 21 acquires the communication data (packet) from the node 90, which was acquired by the network monitoring apparatus 20 and was transmitted to the management server 50 (step S1). The acquired communication data (packet) is assembled (step S2), and the feature extracting unit 22 extracts features from the acquired communication data for each element included in the communication, and generates the feature data (feature value) (step S3). The feature extracting processing will be described in detail later. The processing then advances to step S4.

In step S4 to step S6, the C&C communication detecting processing in accordance with the protocol of the acquired communication (HTTP or SSL/TLS in this embodiment) is executed. The C&C communication detecting processing in accordance with the protocol will be described in detail later with reference to FIG. 5 and FIG. 6. If the C&C communication is not detected in the C&C communication detecting processing (NO in step S7 or step S8), the processing of this flow chart ends. If the C&C communication is detected, (YES in step S7 or step S8), on the other hand, processing advances to step S9 or step S10.

In step S9 to step S12, the infected range estimating processing and the malware family estimating processing in accordance with the protocol of the acquired communication are executed. The infected range estimating processing and the malware family estimating processing in accordance with the protocol will be described in detail later with reference to FIG. 7 and FIG. 8. Then the processing in this flow chart ends.

Figure 5:
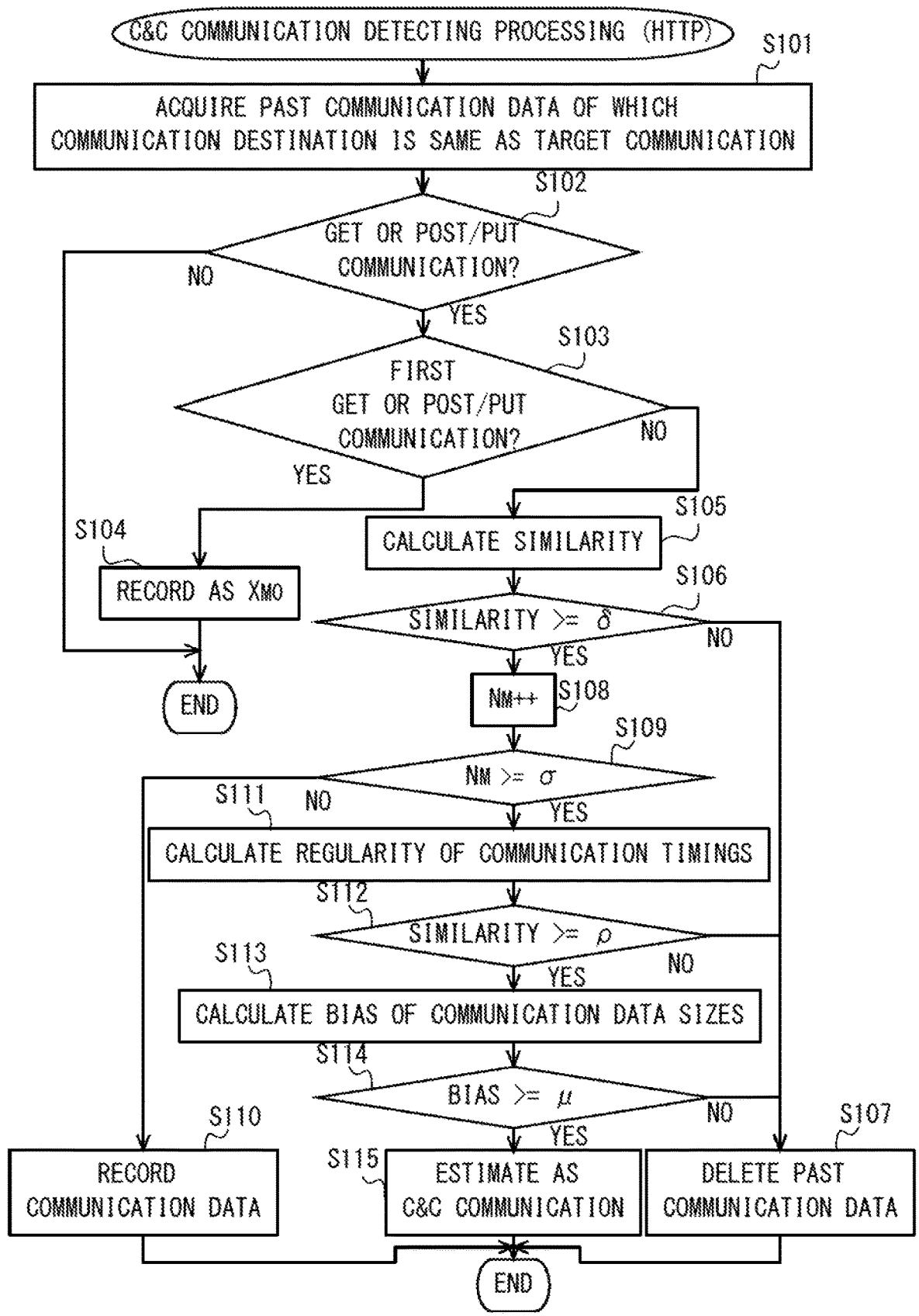
FIG. 5 is a flow chart depicting a general flow of a C&C communication detecting processing (HTTP) according to the embodiment.

FIG. 5 is a flow chart depicting a general flow of the C&C communication detecting processing (HTTP) according to this embodiment. This flow chart is for describing details of the processing in step S5 in FIG. 4. The processing in this flow chart is executed each time a new HTTP communication is received.

In step S101 to step S104, it is determined whether the received communication is the analysis target communication. When data of a new HTTP communication (hereafter called "target communication") is acquired, the information processing apparatus acquires the past communication data that is stored for the same communication destination as the target communication (step S101). If the newly acquired target communication is the first GET or POST/PUT communication in the past communication data stored for the same communication destination as this target communication (YES in step S102, and YES in step S103), the information processing apparatus records this communication data as the first past communication data $X_{M0}$ (step S104), and the processing in this flow chart ends. In this embodiment, the subscript "$_M$" indicates the method of HTTP communication. If the newly acquired target communication is the second or later GET or POST/PUT communication in the past communication data stored for the same communication destination as this target communication (YES in step S102, and NO in step S103), processing advances to step S105. If the target communication is not GET or POST/PUT communication (NO in step S102), on the other hand, then the processing in this flow chart ends.

In step S105, the similarity is calculated. For each element included in the communication, the similarity calculating unit 23 compares the feature data extracted for the target communication and the feature data on the plurality of past communication related to the same communication destination, calculates the element similarity, and calculates the total similarity between communications by weighting each calculated element similarity for each element. The specific method of calculating the similarity will be described later. Then processing advances to step S106.

In step S106 to step S110, it is determined whether at least a predetermined number of communications, of which similarity is at least a predetermined value, were detected. The information processing apparatus determines whether the similarity calculated in step S105 is at least a predetermined value δ (step S106). If the similarity is less than the predetermined value δ, the information processing apparatus deletes the past communication data stored for the same communication destination as the target communication (step S107), and the processing in this flow chart ends. If the similarity is at least the predetermined value δ, on the other hand, then 1 is added to the cumulative number $N_M$ of the similar communication data (step S108), and it is determined whether the cumulative number $N_M$ of the similar communication data reached a predetermined number σ, which can be appropriately used for distribution analysis (step S109). If the cumulative number $N_M$ did not reach the predetermined number σ, the data of the target communication is stored as the past communication data (step S110), and the processing in this flow chart ends. If the cumulative number $N_M$ reached the predetermined number σ, processing advances to step S111.

In step S111 and step S112, the regularity (e.g. cyclicity) of the communication timing is analyzed. If a plurality of communications is HTTP communication, the distribution calculating unit 24 calculates the distribution (regularity of the communication timing in this case) for the request transmission timings related to the GET method or the POST/PUT method for a single destination (step S111). A specific method of analyzing the regularity will be described later.

The estimating unit 25 compares the regularity $RoI_M$ calculated as a result of analysis with a threshold ρ to determine whether there is regularity by which the C&C communication is estimated (step S112). If the regularity $RoI_M$ is less than the threshold ρ as a result of the comparison, it is determined that there is no regularity by which C&C communication is estimated in the stored communication timings, and processing advances to step S107. If the regularity $RoI_M$ is at least the threshold ρ as a result of the comparison, on the other hand, it is determined that there is regularity by which C&C communication is estimated in the stored communication timings, and processing advances to step S113.

In step S113 and step S114, the bias of the communication data size is analyzed. If a plurality of communications is HTTP communication, the distribution calculating unit 24 calculates distribution (bias of communication data sizes in this case) of the data lengths excluding the header portions, of the responses excluding a downloaded execution file, for each GET method or POST/PUT method to a single destination (step S113). The specific method of analyzing the bias of the data sizes will be described later.

The estimating unit 25 compares the bias $BoR_M$ calculated as a result of the analysis with a threshold μ to determine whether there is a bias by which C&C communication is estimated (step S114). If the bias $BoR_M$ is less than the threshold μ as a result of the comparison, it is determined that there is no bias by which C&C communication is estimated in the stored communication data sizes, and processing advances to step S107. If the bias $BoR_M$ is at least the threshold μ as a result of the comparison, on the other hand, it is determined that there is a bias by which C&C communication is estimated in the stored communication data sizes, and processing advances to step S115.

In step S115, it is estimated that the target communication is C&C communication. If it is determined in the processing in steps S111 to S114, that the regularity $RoI_M$, is at least the threshold ρ and bias $BoR_M$ of which level at least the threshold μ, then the estimating unit 25 estimates that the target communication is the C&C communication, and classifies (maps) the terminal that is performing the target communication as a terminal infected by malware which is operating in the C&C communication phase. Then the processing in this flow chart ends.

Figure 6:
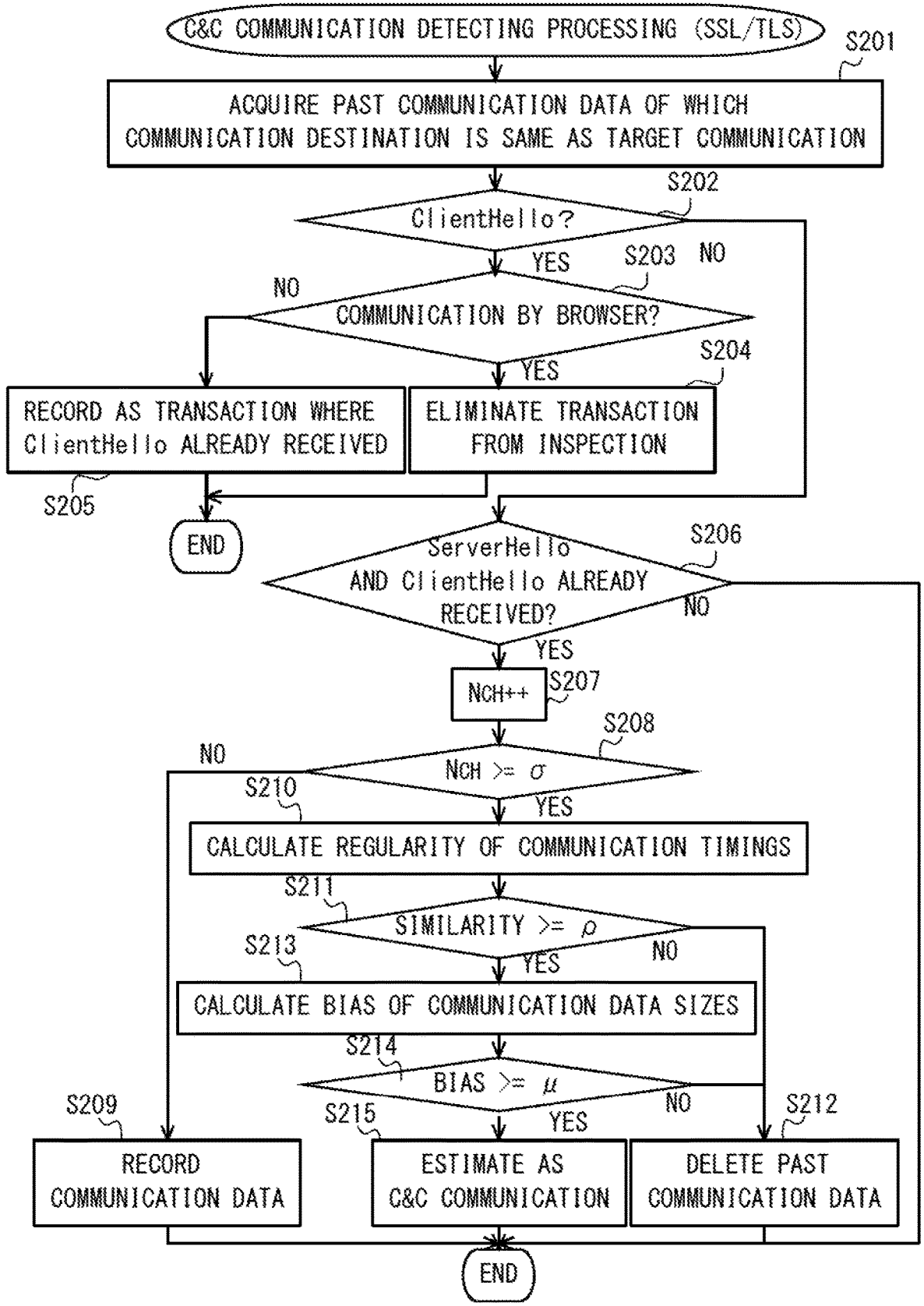
FIG. 6 is a flow chart depicting a general flow of a C&C communication detecting processing (SSL/TLS) according to the embodiment.

FIG. 6 is a flow chart depicting a general flow of the C&C communication detecting processing (SSL/TLS) according to this embodiment. This flow chart is for describing the details of the processing in step S6 in FIG. 4. The processing in this flow chart is executed each time a new SSL/TLS communication is received.

In step S201 to step S206, it is determined whether the received communication is the analysis target communication. When data of a new SSL/TLS communication (hereafter called "target communication") is acquired, the information processing apparatus acquires a past communication data that is stored for the same communication destination as the target communication (step S201). If the newly acquired target communication is the ClientHello message, but is a communication by browser (YES in step S202, and YES in step S203), the information processing apparatus removes the transaction related to this communication from the inspection target (step S204). If the target communication is the ClientHello message and is not communication by a browser (YES in step S202, and NO in step S203), on the other hand, then the information processing apparatus records the transaction related to this communication as a transaction in which the ClientHello message has already been received (step S205). Then the processing in this flow chart ends, and reception of the next SSL/TLS communication is waited.

If the target communication is the ServerHello message and is related to the transaction in which the ClientHello message has already been received (NO in step S202, and YES in step S206), processing advances to S207. Otherwise the processing in this flow chart ends.

In step S207 to step S209, it is determined whether at least a predetermined number of distribution analysis target transactions, in which the ClientHello message and the ServerHello message have been received, were detected. Here 1 is added to the cumulative number $N_{OH}$ of the distribution analysis target transactions (step S207), and it is determined whether the cumulative number $N_{CH}$ of the distribution analysis target transactions reached a predetermined number σ, which is appropriate for the distribution analysis (step S208). The subscript "$_{CH}$" indicates the ClientHello of the SSL/TLS communication. If the cumulative number $N_{CH}$ did not reach the predetermined number σ, the data of the target communication is stored as the past communication data (step S209), and the processing in this flow chart ends. If the cumulative number $N_{CH}$ reached the predetermined number σ, the processing advances to step S210.

In step S210 to step S212, the regularity (e.g. cyclicity) of the communication timing is analyzed. If a plurality of communications are SSL/TLS communication, the distribution calculating unit 24 calculates the distribution (regularity of the communication timing in this case) of the distance between the ClientHello message to a single destination and the ClientHello message immediately after this ClientHello message (step S210). A specific method of analyzing the regularity will be described later.

The estimating unit 25 compares the regularity $RoI_S$ calculated as the result of the analysis with a threshold ρ for determining whether there is regularity by which C&C communication is estimated (step S211). If the regularity $RoI_S$ is less than the threshold ρ as a result of the comparison, it is determined that there is no regularity by which C&C communication is estimated in the stored communication timings, and the information processing apparatus deletes the past communication data stored for the same communication destination as the target communication (step S212). Then the processing in this flow chart ends. If the regularity $RoI_S$ is at least the threshold ρ as a result of the comparison, on the other hand, it is determined that there is regularity by which C&C communication is estimated in the stored communication timings, and processing advances to step S213.

In step S213 and step S214, the bias of the communication data size is analyzed. The distribution calculating unit 24 calculates distribution (bias of communication data sizes in this case) of the data lengths related to a response to a single destination, excluding a response of which size is at least a predetermined size (step S213). A response of which size is at least the predetermined size is excluded, because a response of which size is at least the predetermined size may be a downloaded execution file, which becomes noise when the distribution of the C&C communication is analyzed. The method of excluding a downloaded execution file based on the size is especially useful in the case of an encrypted communication where the content of the response cannot be checked, such as SSL/TLS communication. The specific method of analyzing the bias of the data sizes will be described later.

The estimating unit 25 compares the bias $BoR_S$ calculated as a result of the analysis with a threshold μ to determine whether this is a bias by which C&C communication is estimated (step S214). If the bias $BoR_S$ is less than the threshold μ as a result of the comparison, it is determined that there is no bias by which C&C communication is estimated in the stored communication data sizes, and processing advances to step S212. If the bias $BoR_S$ is at least the threshold μ as a result of the comparison, on the other hand, it is determined that there is a bias by which C&C communication is estimated in the stored communication data sizes, and processing advances to step S215.

In step S215, it is estimated that the target communication is the C&C communication. If it is determined in the processing in step S210 to step S214 that there is the regularity $RoI_S$ which is at least the threshold ρ and bias $BoR_S$ which is at least the threshold ρ, the estimating unit 25 estimates that the target communication is the C&C communication, and classifies (maps) the terminal that is performing the target communication as a terminal infected by malware which is operating in the C&C communication phase. Then the processing in this flow chart ends.

Figure 7:
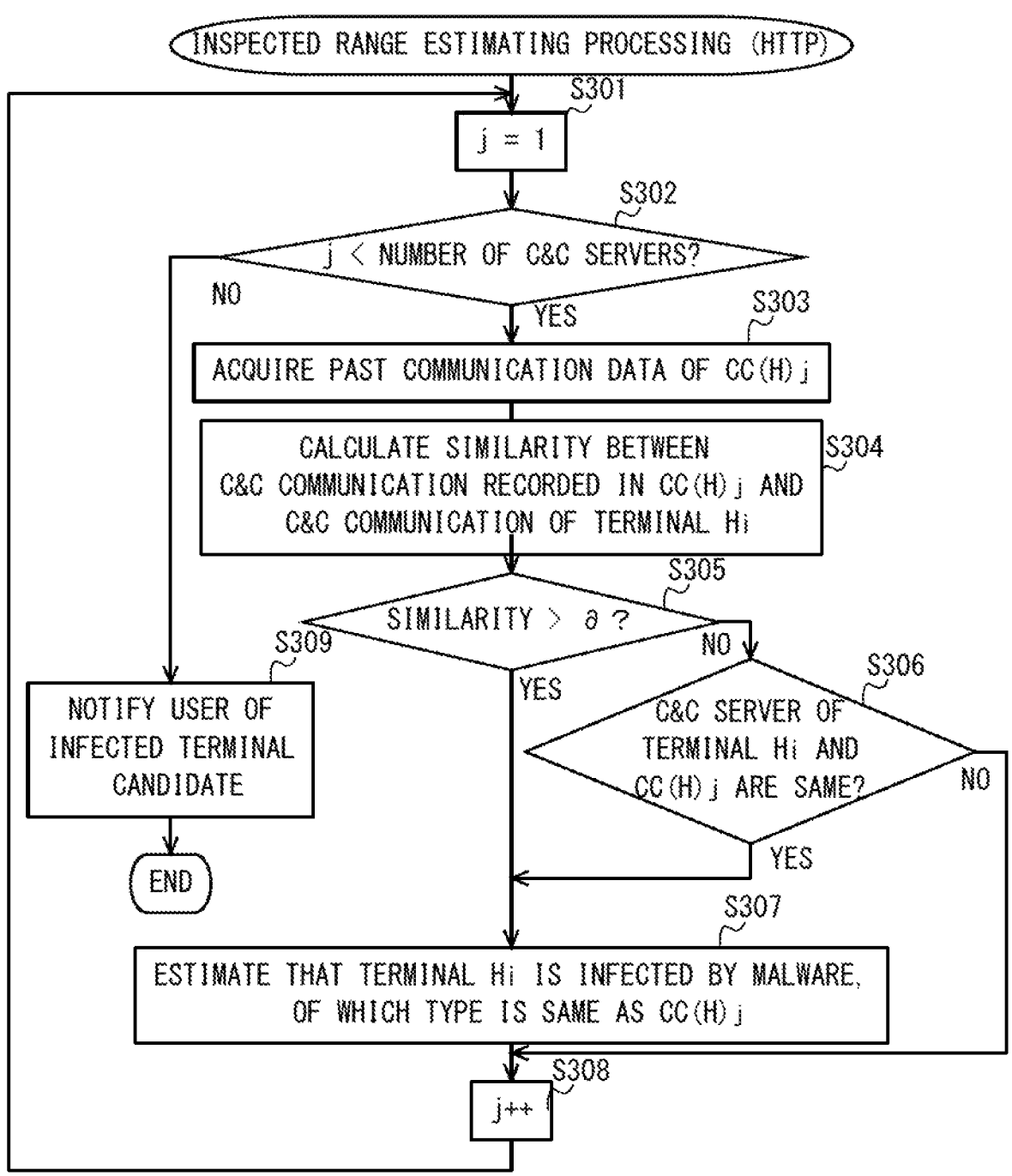
FIG. 7 is a flow chart depicting a general flow of an infected range estimating processing (HTTP) according to the embodiment.

FIG. 7 is a flow chart depicting a general flow of the infected range estimating processing (HTTP) according to this embodiment. This flow chart is for describing details of the processing in step S9 in FIG. 4. The processing in this flow chart is executed each time a new C&C communication of HTTP is detected in the above-mentioned C&C communication detecting processing. In the flow chart to be described below, a terminal in which a new C&C communication is detected is called "terminal $H_i$".

In step S301 and step S302, repeat processing is controlled. The information processing apparatus sets an initial value of 1 for a server index j, which indicates a processing target C&C server CC(H); which is a known (step S301). Then the processing in step S302 to step S308 is repeatedly executed until the server index j exceeds a known number of C&C servers (step S302).

In step S303 and step S304, the similarity is calculated. The information processing apparatus acquires the past communication data stored for the known C&C server $CC(H)_j$ (step S303). Then the similarity calculating unit 23 calculates a similarity $SIM_{TLS}(Y(H_i), X(H)_i)$ between the C&C communication of the terminal $H_i$ (first communication which is estimated as communication by malware by the estimating unit 25) and the C&C communication recorded for a known C&C server $CC(H)_j$ (second communication by a second terminal that is different from the terminal having performed the first communication) (step S304). The specific method of calculating the similarity will be described later. Then processing advances to step S305.

In step S305 to step S308, it is determined that the malware which infected the terminal $H_i$, in which new C&C communication was detected, is the same type of malware as the malware of the known C&C server $CC(H)_j$. The estimating unit 25 determines whether the similarity calculated in step S304 is greater than a predetermined value ∂ (step S305). Further, the estimating unit 25 determines whether the C&C server of the terminal $H_i$, in which a new C&C communication was detected, is the same as a known C&C server $CC(H)_j$ (step S306). If the similarity is greater than the predetermined value ∂, or if the C&C server of the terminal $H_i$ is the same as the known C&C server $CC(H)_j$, the estimating unit 25 estimates that the terminal $H_i$ is infected by malware that is the same type as the malware of the known C&C server $CC(H)_j$, and records this terminal as an infected terminal candidate (step S307). Then 1 is added to the server index j (step S308), and processing returns to step S302.

If it is determined that the server index j exceeded a known number of C&C servers in the step S302, processing advances to step S309. The information processing terminal notifies the user of the estimated range infected by malware, using such a means as outputting the recorded infected terminal candidates on a screen (step S309). Then the processing in this flow chart ends.

The flow of the infected range estimating processing (SSL/TLS) in step S10 in FIG. 4 is generally the same as the flow of the infected range estimating processing (HTTP) described with reference to FIG. 7, except that: this flow is executed each time the new C&C communication of SSL/TLS is detected in the above mentioned C&C communication detecting processing; and the target of the similarity evaluation is not the HTTP request transaction but the SSL/TLS transaction, hence description of this flow is omitted. The specific method of calculating the similarity will be described later.

Figure 8:
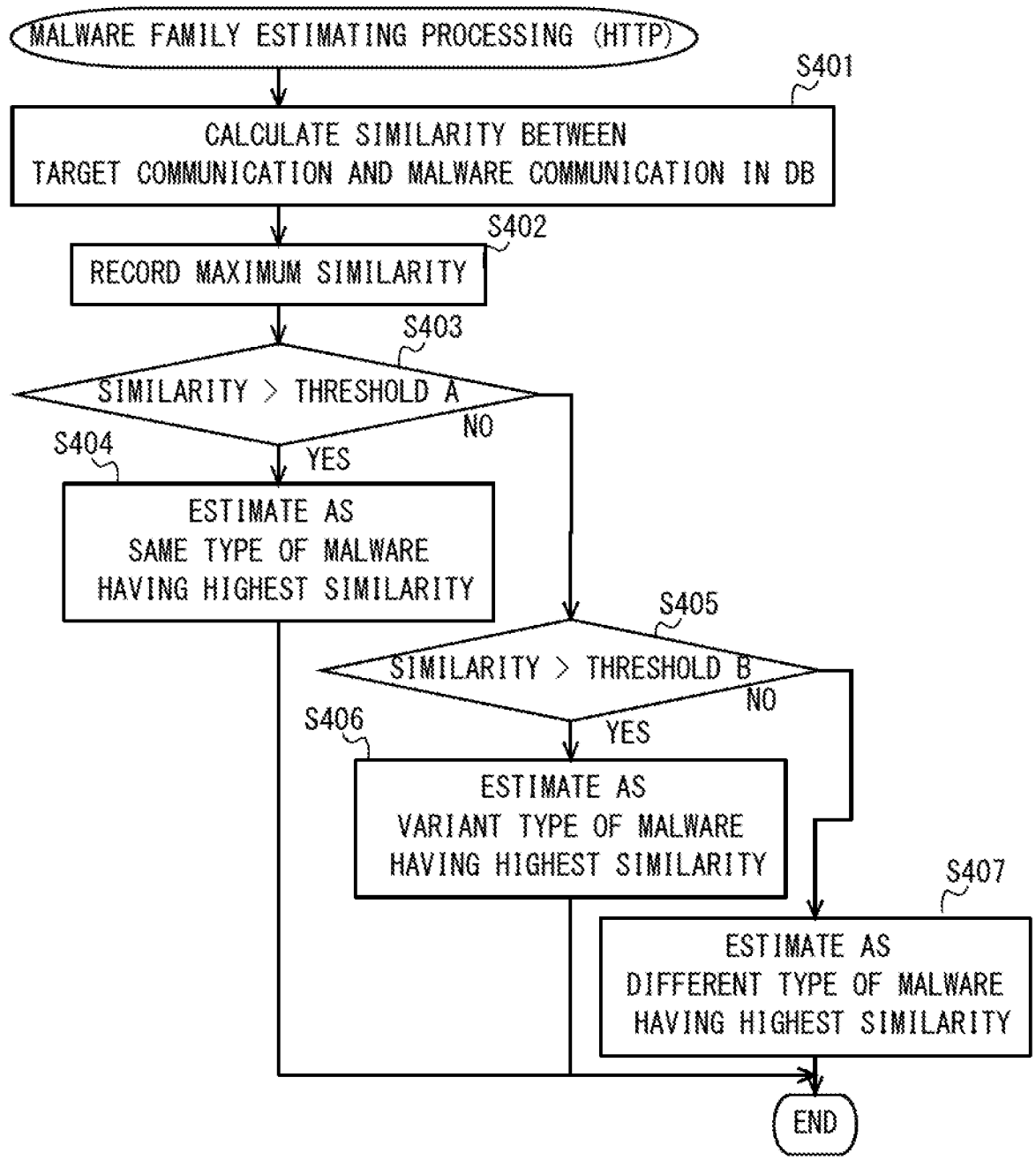
FIG. 8 is a flow chart depicting a general flow of a malware family estimating processing (HTTP) according to the embodiment.

FIG. 8 is a flow chart depicting a general flow of the malware family estimating processing (HTTP) according to this embodiment. This flow chart is for describing the details of the processing in step S11 in FIG. 4. The processing in this flow chart is executed each time a new C&C communication of HTTP is detected in the above-mentioned C&C communication detecting processing. The processing in this flow chart may be started at a timing when the user selects the HTTP communication to be the target of the malware family estimation, and accepts the instruction to start the estimating processing.

In step S401 and step S402, among the similarities between the communication to be the target of the malware family estimation and each of a plurality of malware communications stored in the malware communication data base (which stores the communication data by the malware and/or the feature data of the communication data by the malware), the highest similarity is acquired. The similarity calculating unit 23 calculates the similarity between the communication to be the target of the malware family estimation (first communication which is estimated as the communication by malware by the estimating unit 25) and each of a plurality of (e.g. all of) the malware communications (known communications by a known software) stored in the malware communication database (step S401). The specific method of calculating the similarity will be described later. Then out of the calculated similarities between the communication to be the target of the malware family estimation and each of the plurality of malware communications stored in the malware communication database, the information processing apparatus records the highest similarity as the similarity $SIM_{HTTP}(Y(\beta), X(\alpha))$ (step S402). Then processing advances to step S403.

In step S403 to step S407, the malware family is estimated. By comparing the highest similarity $SIM_{HTTP}$ acquired in step S402 with a threshold A to estimate a same type, and a threshold B to estimate a variant type (threshold A>threshold B in this case) (step S403 and step S405), the estimating unit 25 estimates that the malware related to the communication to be the target of the malware family estimation is a same type, a variant type or a different type of a known malware having the highest similarity $SIM_{HTTP}$. In concrete terms, if the highest similarity $SIM_{HTTP}$ is greater than the threshold A, the estimating unit 25 estimates that the malware of the target communication is the same type as the known malware having the highest similarity $SIM_{HTTP}$ (step S404). If the highest similarity $SIM_{HTTP}$ is not more than the threshold A and is greater than the threshold B, the estimating unit 25 estimates that the malware of the target communication is a variant type of the known malware having the highest similarity $SIM_{HTTP}$ (step S406). And if the highest similarity $SIM_{HTTP}$ is not more than the threshold B, the estimating unit 25 estimates that the malware of the target communication is a different type of known software having the highest similarity $SIM_{HTTP}$ (step S407). The information processing apparatus may output the estimation result on screen to notify the user. Then the processing in the flow chart ends.

The flow of the malware family estimating processing (SSL/TLS) in step S12 in FIG. 4 is generally the same as the flow of the malware family estimating processing (HTTP) described with reference to FIG. 8, except that: this flow is executed each time the new C&C communication of SSL/TLS is detected in the above mentioned C&C communication detecting processing; this flow may be started at a timing when the user selects the SSL/TLS communication to be the target of the malware family estimation, and accepts the instruction to start the estimating processing; and the target of the similarity evaluation is not the HTTP request packet but the SSL/TLS transaction, hence description of this flow is omitted. The specific method of calculating the similarity will be described later.

Structural Similarity of HTTP Communication

A specific method of calculating the similarity, in the case when the target communication is the HTTP communication, will be described. According to this embodiment, in the case of the HTTP communication, an element similarity of the following elements of the HTTP request header is calculated for the GET method and the POST/PUT method respectively, and the total similarity SIM(X, Y) is ultimately calculated. Here X and Y indicate the HTTP requests.

Similarity $S_r$ in HTTP Request Line Format

For the two X and Y requests, the similarity calculating unit 23 represents the request lines by a set $R_L$ abstracted by a predetermined rule, and calculates the similarity Sr between the URI and the HTTP versions after the method is removed from the request line by using the following expression. Here "$J_{ac}(\ )$" is an enumeration function of a Jaccard coefficient, and indicates the commonality of the elements included in the set.

$$S_r(X,Y)=J_{ac}(R_L(X),R_L(Y))$$

Similarity $S_n$ of HTTP Request Header Type

For the two X and Y requests, the similarity calculating unit 23 prepares a set $H_n(X)$ of the request header type generated by converting the request header name in accordance with a conversion table, and calculates the similarity $S_n$ of the request header types included in the request headers by using the following expression. In this embodiment, an unidentified request header is handled as an "unknown request header".

$$S_{11}(X,Y)=J_{ac}(H_n(X),H_n(Y))$$

Similarity $S_o$ of the Arrangement Order of HTTP Request Header

For the two X and Y requests, the similarity calculating unit 23 prepares a character string $H_o(X)$ generated by converting the request header name in accordance with a conversion table, so as to abstract the arrangement order of the request header, and calculates the similarity $S_o$ of the arrangement order of the request header types included in the request headers. In this embodiment, an unidentified request header is handled as an "unknown request header". In the following expression, "NDL( )" indicates the standardized Damerau-Levenshtein distance, and represents the similarity of character strings. |K| and |L| indicate the length (number of characters) of the character strings K and L.

$$S_o(X,Y)=\text{NDL}(H_o(X),H_o(Y))$$

$$\text{NDL}(K,L)=1.0-DL(K,L)/\max(|K|,|L|)$$

DL(K, L): Damerau-Levenshtein distance of K and L

In this embodiment, if a header used in the Proxy environment (e.g. "Forwarded", "Max-Forwards", "Proxy-Authorization", "Via", "Warning", "X-Forwarded-For") is set, this header is ignored (regarded as not being set). Determining the name of the request header is case insensitive, and is replaced with a symbol that is set in advance for each request header (e.g. "Accept:" is substituted for "A", and "Content-Length:" is substituted for "L").

Similarity $S_v$ of Major Request Header Value

For the two X and Y requests, the similarity calculating unit 23 prepares a set $H_v(X)$ abstracted by converting the major request header values in accordance with a conversion table, and calculates the similarity $S_v$ of the common major request headers when values which are set in major request headers are abstracted in accordance with a rule using the following expression.

$$S_v(X,Y)=J_{ac}(H_v(X),H_v(Y))$$

Similarity $S_p$ of Query Parameter of Request URI

For the two X and Y requests, the similarity calculating unit 23 prepares a set $P_r(X)$ by extracting a key value of the parameters of the query portion of the request line, and calculates the similarity $S_p$ of the parameter group types of the query portion of the request URI using the following expression.

$$S_p(X,Y)=J_{ac}(P_r(X),P_r(Y))$$

Total Similarity $\text{SIM}_{HTTP}$ of HTTP Communication

Then the similarity calculating unit 23 weights each of the calculated similarities for each element as the element similarity (weighting factors: $\omega_r$, $\omega_n$, $\omega_o$, $\omega_v$, $\omega_p$) and totals the results, so as to calculate the total similarity $\text{SIM}_{HTTP}$ (X, Y). In this embodiment, the total similarity $\text{SIM}_{HTTP}$ (X, Y) is normalized to a value within a predetermined range (e.g. at least 0, not more than 1.0).

$$\text{SIM}_{HTTP}(X,Y)=\omega_r\cdot S_r(X,Y)+\omega_n\cdot S_n(X,Y)+\omega_o\cdot S_o(X,Y)+\\ \nu S_v(X,Y)+\omega_p\cdot S_p(X,Y)$$

Structural Similarity of SSL/TLS Communication

A specific method of calculating the similarity in the case when the target communication is SSL/TLS communication will be described. According to this embodiment, in the case of the SSL/TLS communication, a series of traffic "(establishment of TCP connection)→SSL/TLS negotiation→data transmission/reception in SSL/TLS session→(release of TCP connection)" is defined as the SSL/TLS transaction, and the similarity of each transaction is determined.

Similarity $\text{TS}_{CHFP}$ of Fingerprint of ClientHello Message

The similarity calculating unit 23 calculates the similarity of the fingerprint of the ClientHello message which is transmitted at the start of the SSL/TLS transaction S, so as to compare the TLS version, the list of encryption algorithms and the like. This is because the protocol elements of the ClientHello messages sent by various malwares slightly differ, and the protocol element of the ClientHello message becomes one of the feature values to specify malware. In concrete terms, according to this embodiment, the similarity $\text{TS}_{chfp}$ (S, T) of the ClientHello messages that are transmitted at the start of the SSL/TLS transactions S and T is calculated using a binary function, which is "1" if the fingerprints match, and "0" if the fingerprints differ.

Similarity $\text{TS}_{CSNI}$ of SNI of ClientHello

The similarity calculating unit 23 calculates the similarity of SNI (server name) of the ClientHello message which is transmitted at the start of the SSL/TLS transaction S. In concrete terms, according to this embodiment, the similarity $\text{TS}_{CSNI}$ (S, T) of SNI of the ClientHello is calculated using a binary function, which is "1" if SNI of the SSL/TLS transaction S matches with SNI of the SSL/TLS transaction T, and SNI of the transaction S is not NULL, and "0" otherwise.

Similarity $\text{TS}_{NOSP}$ of Number of Patterns of Request Size

The similarity calculating unit 23 defines the similarity $\text{TS}_{nosp}$ (S, T) of the number of patterns of the request sizes between the SSL/TLS transaction Si (i=1, . . . ) and the SSL/TLS transaction Tj (j=1, . . . ), using a binary function, which is "1" if the number of classes to which the transaction Si (i=1, . . . ) is classified in the later described classification matches with the number of classes to which the transaction Tj (j=1, . . . ) is classified, and "0" otherwise.

Here, in concrete terms, the transaction is classified by analyzing the tendency of the size of the first request packet which is transmitted from the client to the server, for a plurality of SSL/TLS transactions Sj (j=1, . . . ) transmitted/received between the same client and server according to the following procedure.

For 15 SSL/TLS transactions Sj (j=1, . . . 15), the data length Rj of the first Application Data, which is transmitted from the client to server, is measured after SSL/TLS negotiation completes. Here the set of measured data lengths is assumed to be ReqSize={R1, R2, R3, . . . R14, R15}.

The set ReqSize of the data length is classified into n number of classes Cn, which are relatively prime approximate values (±10%).

Out of the relatively prime classes Cn determined by the above procedures, the number of classes Cn that satisfies |Cn|≥3, that is m, is defined as NoSP (Number of request Size Patterns). Here classes are limited to the classes that satisfy |Cn|≥3, so that accidently generated classes are eliminated.

A set of averages Avg (Ck) of the data lengths Rj belonging to m number of classes Ck (k=1, . . . m) is defined as AoSP (Average of request Size Patterns).

Generally the format of the request packet transmitted by malware is fixed (=request size is fixed). Therefore, the value of NoSP(S), which corresponds to the type of the request format (e.g. GET, POST/PUT), becomes one of the feature values to specify the malware. For example, if the HTTP based malware is NoSP(S)=2, it is more likely that the malware uses both the GET and POST/PUT methods.

Similarity $\text{TS}_{NOIC}$ of Number of Cycles in Transmission Interval

The similarity calculating unit 23 defines the similarity $\text{TS}_{noic}$ (S, T) of the number of cycles in the transmission interval of the ClientHello messages which are transmitted at the start of the SSL/TSL transaction Si(i=1, . . . ) and the transaction Tj (j=1, . . . ), using a binary function, which is "1" if the number of cycles NoIC (Number of Interval Cycles) in the transmission interval match, and "0" otherwise.

Here, in concrete terms, the transaction is classified by analyzing the similarity of the number of cycles in the transmission interval of each ClientHello message, for a plurality of SSL/TLS transactions Sj (j=1, . . . ) transmitted/received between the same client and server, according to the following procedure.

The number of classes Cn in the transmission interval of the ClientHello messages that satisfy the following conditions is defined as the number of NoIC cycles in the transmission interval. The average value <Cn> of the values belonging to the class Cn in the transmission interval that satisfies the following conditions indicates the individual cycle value.

$$NoIC(S)=|\{C_n|RoI_S(C_n)=|T_{ol}(C_n)|/|C_n|| \geq \rho, \forall |C_n| \geq 4\}|$$

Generally the number of cycles in the transmission interval of a malware is 1, but there are some malware of which the number of cycles is 2 or 3, hence the number of cycles is one of the feature values to specify a malware.

Similarity $TS_{CTYP}$ of SSL Server Certificate Type

The similarity calculating unit 23 defines the similarity $TS_{ctyp}$ (S, T) of the SSL server certificate type included in the Certificate messages, which are included in the SSL/TLS transaction S and the transaction T, and transmitted from each server using a binary function, which is "1" if the SSL server certificate types CertType (S) and CertType (T) of the Certificate message match, and "0" otherwise. In concrete terms, the similarity calculating unit 23 compares the SSL server certificate types (e.g. valid CA certificate, self-signed certificate, no certificate) of the Certificate message transmitted from the server. A cyber attacker often disposes a plurality of C&C servers (or C&C relay servers) to establish an attack base, but in many cases, the same types of SSL server certificates are used, hence the SSL server certificate type becomes one of the feature values to specify malware corresponding to a C&C server.

Total Similarity $SIM_{TLS}$ of SSL/TLS Communication

Then the similarity calculating unit 23 weights each of the calculated similarities for each element as the element similarity (weighting factors: $\omega_1, \omega_2, \omega_3, \omega_4, \omega_5$) and totals the results, so as to calculate the total similarity $SIM_{TLS}$ (X, Y). In this embodiment, the total similarity $SIM_{TLS}$ (X, Y) is normalized to a value within a predetermined range. $SIM_{TLS}$ (X, Y)=$\omega_1 \cdot TS_{chfp}$(X, Y)+$\omega_2 \cdot TS_{csni}$(X, Y)+$\omega_3 \cdot TS_{nosp}$(X, Y)+$\omega_4 \cdot TS_{noic}$(X, Y)+$\omega_5 \cdot TS_{ctyp}$(X, Y)

Regularity of Communication Timing

In this embodiment, as described above with reference to the flow chart, request communications transmitted/received on the network are collected, and communication timing (transmission interval in this embodiment) is recorded for the transmission or reception communication. In concrete terms, in the case of HTTP communication, the request transmission interval is determined and recorded for each of the GET method or POST/PUT method of the HTTP request for a certain destination Dst. In the case of SSL/TLS communication, on the other hand, the transmission interval of the ClientHello message to a certain destination Dst and the ClientHello message immediately after this is determined and recorded. Then the regularity of the communication timing is analyzed by the following method described hereinbelow.

To analyze the frequency distribution for a set of recorded transmission intervals, the distribution calculating unit 24 divides the recorded transmission intervals into classes based on a transmission interval (intervals to tabulate the frequencies, indicated by $C_n$ (n=1, 2, ... )), and calculates the regularity (RoI: Regularity of Interval). Here the frequency is the number of elements of the measurement data included in the class $C_n$, and is indicated by $|C_n|$ (n=1, 2, ... ). Then based on the calculated regularity RoI, the distribution calculating unit 24 determines whether there is regularity in all transmission intervals. In this embodiment, the minimum value and the maximum value of the cycles of the analysis target data are used as thresholds, and data outside the thresholds are regarded as errors, and are not used for analysis, so as to improve the accuracy of the analysis.

In this embodiment, the regularity RoI of the transmission intervals (interval time) is calculated according to the following procedure. In this embodiment, the regularity RoI is output as a value in a 0 to 1 range, and has higher regularity as the value of the regularity RoI is closer to 1.

(1) The transmission interval $I_i$ (i=1 to σ) between a packet $X_i$ and a packet $X_{i+1} \in TR$ (TR is a set of requests) is measured for σ times, and the set of the transmission intervals is regarded as a set Intvl.

(2) Out of the set Intvl of the transmission intervals, $I_i$ that satisfies $I_i$<250 ms is substituted for 250 ms (transmission intervals less than 250 ms are in a delay error range, therefore all values are regarded as 250 ms).

(3) The maximum value Max($I_m$) and the minimum value Min($I_n$) are determined from the set Intvl of the transmission intervals, and the class width (interval) $K_c$ is determined. Here it is assumed that the number of classes Nc=1+ 3.332*log 10M (M: total number of numeric data). The final class width (interval) $K_c$ is determined by rounding the data off to the nearest whole number (integer). If $K_c$ is 1 or less it is regarded as $K_c$=1.

$$K_C=(Max(I_m)+Min(I_n))/N_C$$

(4) The set Intvl of the transmission intervals is equally divided into $N_c$ number of classes $C_n$ (n=1 to $N_c$) with the class width $K_c$, and the measured transmission interval $I_i \in$ Intvl is classified into an appropriate class. For $C_n$ of the frequency $|C_n| \leq 1$, the calculations in (4), (5) and (6) may be omitted.

(5) The following values are calculated for each class $C_n$ (n=1 to $N_c$).

Avg($C_n$)=$\Sigma C_n I_i / |C_n|$: average value of transmission intervals belonging to $I_i \in Cn$ (msec)

Inf($C_n$)=Avg ($C_n$)*(1−θ): allowable lower limit value of transmission intervals belonging to $C_n$ (average−allowable error) (msec)

Sup($C_n$)=Avg($C_n$)*(1+θ): allowable upper limit value of transmission intervals belonging to $C_n$ (average+allowable error) (msec)

(6) For each class $C_n$ (n=1 to $N_c$), a set Tol($C_n$) of the transmission intervals $I_i$ existing in the range of allowable lower limit value Inf($C_n$) and allowable upper limit value Sup($C_n$), and the number of elements |Tol($C_n$)| of the transmission intervals $I_i$ are included in the set.

$$Tol(C_n)=\{I_i \in C_n | Inf(C_n) \leq I_i \leq Sup(C_n), |C_n|>0\}, n=1 \text{ to } N_c$$

(7) The regularity RoI of the transmission intervals is defined by the following expression. $C_n$ of $|C_n|$<4 is excluded from the evaluation targets.

$$RoI=\min\{RoI(C_n)|RoI(C_n)=|Tol(C_n)|/|C_n|, \forall \geq 4\},$$
$$0 \leq RoI \leq 1.0$$

Bias of Communication Data Size

As described in the above flow charts, in this embodiment, request communications which are transmitted/received on the network are collected, and data sizes of the transmitted/received communications are recorded. In concrete terms, in the case of HTTP communication, the data length excluding the header portion, of the HTTP response to a certain destination Dst is recorded for each GET method and POST/PUT method. By inspecting the response data, a communication, in which an execution file may have been downloaded, can be eliminated. Further, in the case of the SSL/TLS communication, the Application Data (C to S) from the client to the server in the SSL/TLS transaction to a certain destination Dst is regarded as the request data, and the Application Data (S to C) from the server to the client immediately after the request data is regarded as the response data, and the total value of the length field values of the response data is recorded. In this embodiment, a series of Application Data messages (S to C), where the Application Data message (C to S) is not interrupted, is regarded as the response data, and the total value of the length field values is regarded as the response data length. If the response data length is at least 65536 (64K) bytes, this response is regarded as a downloaded binary file, and this SSL/TLS transaction is ignored (outside measurement target). Then the bias of the communication data sizes is analyzed by the method described hereinbelow.

In this embodiment, the distribution calculating unit 24 calculates an average value of the set of recorded response data lengths according to the following procedure, determines the number of received data lengths that deviated considerably from the average value, and calculates the bias BoR of the communication data size based on the level of this number. In this embodiment, the bias BoR is output in the 0 to 1 range, and the data lengths have greater bias as the value of the bias BoR is closer to 1.

(1) The data byte length $RL(X_i)$ ($i=1$ to $\delta$) of a response packet corresponding to the request packet $X_i \in TR$ (TR is a set of requests) is measured and recorded for $\delta$ times (e.g. $\sigma+1$ times), and the set of the response data lengths is regarded as a set RL.

(2) The upper limit threshold SRL of the set RL of the response data lengths is determined.

$SRL=(\Sigma i RL(X_i)/\delta)*1.2, RL(X_i)\in RL$: SRL=average data byte length×1.2

(3) A set $TR_{SRL}$ of request packets $X_i$, of which data byte length of the response packet corresponding to the request packet $X_i$ is less than the upper limit threshold SRL, and the number of elements $|TR_{SRL}|$ included in the set are determined.

$TR_{SRL}=\{X_i \in TR | RL(X_i)<SRL, RL(X_i)\in RL\}$ (4) The degree of bias BoR of the response data lengths is defined by the following expression.

$BoR=|TR_{SRL}|/\delta, 0<BoR\leq 1.0$

Detection of C&C Communication

The flow of detecting the C&C communication will be described.

Detecting C&C Communication in HTTP

A C&C communication of each malware which uses HTTP has the following features.

(1) The URI formats and the configuration and format of the request header of the HTTP request group, which is transmitted to/received from a same C&C server (destination), are very similar in each method. In other words, it is rare that HTTP request groups having a plurality of URIs and request headers in different formats are used, unlike the case of communication of a valid application. This is because the C&C communication targets a simple information exchange between the malware and the cyber attacker.

(2) A fixed value is often used for a value of a typical request header of an HTTP request which is transmitted to/received from a same C&C server (destination). However, there are some malware which transfer information to a C&C server using User-Agent requests, cookies and extended/original header values.

(3) The transmission intervals (interval time) of the HTTP requests which are transmitted to a same C&C server (destination) have a regularity (e.g. cyclicity) for each method. In other words, compared with communication of a valid application, the transmission intervals of the C&C communication have a higher degree of regularity. This tendency is especially conspicuous immediately after check in to the C&C server, or in a beacon packet (instruction inquiring packet to the C&C server).

(4) The data transmitted from the C&C server (response data) is configuration definition information (data volume: medium to large) and instructions (data value: small) to the malware, except for binary data (download phase of execution file: update of malware, new malware, various tools). Since it is rare for configuration definition information to be transmitted frequently, most of the transmitted data is instructions. In other words, compared with valid applications, it is more likely that data (response data) transmitted from the C&C server has bias in most or in all of the response data lengths.

In this embodiment, the features of the C&C communication of the above mentioned malwares are formulated as follows.

TR(Dst): a set of HTTP requests address to destination Dst $TR_G(Dst)$: a set of GET requests, $\subset TR(Dst)$, which do not correspond to the download phase of the execution file $TR_P(Dst)$: a set of POST/PUT requests, $\subset TR(Dst)$, which do not correspond to the download phase of the execution file X: a (first) HTTP request of which origin belongs to $TR_G(Dst)$ or $TR_P(Dst)$ Y: an arbitrary HTTP request following X belonging to $TR_G(Dst)$ or $TR_P(Dst)$ $RoI_G(Dst)$: degree of regularity of transmission intervals of the HTTP requests belonging to $TR_G(Dst)$ $RoI_P(Dst)$: degree of regularity of transmission intervals of the HTTP requests belonging to $TR_P(Dst)$ $BoR_G(Dst)$: degree of bias of response data lengths of the HTTP request belonging to $TR_G(Dst)$ $BoR_P(Dst)$: degree of bias of response data lengths of the HTTP request belonging to $TR_P(Dst)$ In this embodiment, the estimating unit 25 estimates that the communication addressed to Dst that satisfies all the following conditions is the C&C communication.

$TR_G(Dst)=\{Y\in TR_G(Dst)|SIM_{HTTP}(X,Y)\geq \partial, X, \forall Y \in TR_G(Dst)\}$ and $TR_P(Dst)=\{Y\in TR_P(Dst)|SIM_{HTTP}(X,Y)\geq \partial, X, \forall Y \in TR_P(Dst)\}$ and $RoI_G(Dst)\geq \rho$ or $RoI_P(Dst)\geq \rho$ and $BoR_G(Dst)\geq \mu$ or $BoR_P(Dst)\geq \mu$ Detecting C&C Communication in SSL/TLS A C&C communication of each malware which uses SSL/TLS protocol has the following features.

(1) The transmission intervals (interval time) of the ClientHello messages, which are transmitted to a same C&C server (destination) have a regularity (e.g. cyclicity). In other words, compared with the SSL/TLS communication of a valid application, the transmission intervals of the ClientHello messages have a higher degree of regularity. This tendency is especially conspicuous immediately after check in to the C&C server, or in a beacon packet (instruction inquiry packet to the C&C server).

(2) The Application Data message transmitted from the C&C server (response data) is configuration definition information (data volume: medium to large) and instructions (data volume: small) to the malware, except for binary data (update of malware, new malware, various tools). Since it is rate for the configuration definition information to be transmitted frequently, most of the transmitted data is instructions. In other words, compared with valid applications, it is more likely that in the Application Data message transmitted from the C&C server has bias in most or in all the data lengths of the Application Data.

In this embodiment, the features of the C&C communication of the above-mentioned malwares are formulated as follows.

$TR_S(Dst)$: a set of SSL/TLS transactions (series of SSL/TLS message groups, from the ClientHello message to Encrypted Alert message) address to destination Dst $BR(CH(Dst))$: sufficient conditions for SSL/TLS transaction by browser $RoI_S(Dst)$: degree of regularity of transmission intervals of ClientHello messages belonging to $TR_S(Dst)$ $BoR_S(Dst)$: degree of bias of data lengths of Application Data messages (S to C) belonging to $TR_S(Dst)$ In this embodiment, the estimating unit 25 estimates that the communication address to Dst that satisfies all of the following conditions is the C&C communication. In this embodiment, mis-detection and processing load are decreased by eliminating browser communication, which comprises most business communication, from a target.

$\neg BR(CH(Dst))$(not SSL/TLS communication by browser) and $RoI_S(Dst) \geq \rho$ and $BoR_S(Dst) \geq \mu$ Estimating Malware Family A flow of estimating a malware family will be described next.

Estimating Malware Family in HTTP

In this embodiment, the estimating unit 25 detects a known or variant (unknown) malware using the HTTP traffic of a known malware registered in the learning data base MalDB, and estimates a malware name.

For the HTTP traffic $Y(\beta)$ transmitted/received by malware $\beta$ of which name is estimated, the similarity calculating unit 23 calculates the similarity $SIM_{HTTP}(Y(\beta), X(\alpha))$ with the traffic (e.g. all traffic) of malware (e.g. all malwares) registered in the MalDB, and determines a malware $\alpha$ to which the HTTP traffic having the highest similarity belongs. Then the estimating unit 25 estimates whether the malware related to the target communication is the same type, a variant type, or a different type of a known malware having the highest similarity $SIM_{HTTP}$ by comparing the highest similarity $SIM_{HTTP}$ with a threshold A for determining a same type and a threshold B for determining a variant type (threshold A>threshold B in this case).

In the above determination, if there are a plurality of malwares $\alpha i$ (i: malware ID) having a same value of $SIM_{HTTP}(Y(\beta), X(\alpha))$, the total value of each of the following similarities is sequentially evaluated, and a malware $\alpha$, of which a value of HTTP traffic is greater, is selected.

$S_r(Y(\beta),X(\alpha_i))+S_p(Y(\beta),X(\alpha_i))$ $S_r(Y(\beta),X(\alpha_i))+S_p(Y(\beta),X(\alpha_i))+S_o(Y(\beta),X(\alpha_i))$ $S_r(Y(\beta),X(\alpha_i))+S_p(Y(\beta),X(\alpha_i))+S_o(Y(\beta),X(\alpha_i))+S_n(Y(\beta),X(\alpha_i))$ Estimating Malware Family in SSL/TSL In this embodiment, the estimating unit 25 detects a known or variant (unknown) malware using the SSL/TLS traffic of a known malware registered in the learning database MalDB, and estimates a malware name.

For SSL/TLS traffic $T(\beta)$ transmitted/received by malware $\beta$ of which name is estimated, the similarity calculating unit 23 calculates the similarity $SIM_{TLS}(Y(\beta), S(\alpha))$ with the traffic (e.g. all traffic) of malware (e.g. all malwares) registered in the MalDB, and determines a malware $\alpha$ to which the SSL/TLS traffic having the highest similarity belongs. Then the estimating unit 25 estimates whether the malware related to the target communication is the same type, a variant type, or a different type of a known malware having the highest similarity $SIM_{TLS}$ by comparing the highest similarity $SIM_{TLS}$ with a threshold A for determining a same type and a threshold B for determining a variant type (threshold A>threshold B in this case).

In the above determination, if there are a plurality of malwares $\alpha_i$ (i: malware ID) having a same value of $SIM_{TLS}(Y(\beta), S(\alpha))$, the estimating unit 25 selects a malware $\alpha_i$ to which SSL/TLS traffic, having a value closest to the above mentioned average request AoSP (Average of request Size Patterns), of the patterns belong.

Estimating Infected Range

A flow of estimating the infected range of malware will be described next. When a monitoring target host H is infected by a malware, it is possible that the host H may be simultaneously infected by a plurality of types of malwares. For example, malwares may be sent in stages, such as stage one, stage two. Generally a feature of traffic (C&C traffic) used for communication with the C&C server is different depending on the malware, hence by classifying the C&C traffic detected by the host H according to similarity, the correspondence between malware $\alpha$ and the C&C traffic group of the malware $\alpha$, and the correspondence between the C&C traffic group of the malware $\alpha$ and the C&C server address group of the malware $\alpha$ are acquired, whereby the infected range can be estimated for each type of malware infecting the host H.

In this embodiment, the information processing apparatus classifies the address group CC(H) of the C&C server detected for the host H, according to the following procedure, into n number of classes CC(H)i (i=1, . . . n) which are relatively prime, based on the similarity of the traffic.

(1) A C&C server address $A1 \in CC(H)$ to be a start point of classification is arbitrarily selected.

(2) The address group CC(H) is classified into n number of classes which are relatively prime, using the similarity evaluation function ($SIM_{HTTP}$ or $SIM_{TLS}$). The classified CC(H)i (i=1, . . . n) satisfies the following relationship. Here TR(H) indicates a C&C traffic group detected for the host H.
CC(H)=CC(H)1∪CC(H)2∪ . . . ∪CC(H)n, however if i≠j, then CC(H)i∩CC(H)j={ }
TR(H)=TR(CC(H)1:H)∪TR(CC(H)2:H)∪ . . . ∪TR(CC(H)n:H)
CC(H)k⇔TR(CC(H)k:H)⇔malware $\alpha$k; corresponding to 1 to 1

Estimating Infected Range in HTTP

The subsequent processing is different depending on whether communication is HTTP or SSL/TLS. If the communication is HTTP, the estimating unit 25 estimates a host group Hm infected by the same type of malware infecting the host H (that is, the infected range), according to the following procedure, among malwares which use HTTP for communication with the C&C server.

(1) A target host H to be a start point to estimate the infected range is selected.
(2) From monitoring target hosts (excluding the host H), in which HTTP request packets determined as another C&C communication and C&C server address are recorded, a host group Inf(H) of which similarity with the target HTTP request packet is at least a predetermined value, or of which C&C server address is the same as the target host H, is extracted.
(3) The host group Inf(H) extracted in (2) is estimated as a host group Hm which is infected by a same type of malware as the malware infecting the host H. In other words, the host group Inf(H) is estimated as an infected range. Further, in order to estimate the infected range of individual malware $\alpha k$ infecting the target host H at the start point, the host group Inf(H) (=Inf(H|$\alpha k$)) is determined as within the range of the C&C server address group and the C&C traffic group corresponding to the malware $\alpha k$.

Estimating Infected Range in SSL/TLS

If the communication is SSL/TLS, the estimating unit 25 estimates a host group Hm infected by the same type of malware infecting the host H (that is, the infected range) according to the following procedure, among malwares which use the SSL/TLS protocol for communication with the C&C server. Here it is assumed that the information (feature value) required for the similarity evaluation function SIM TLS (S, T) has been collected as a C&C server candidate which was detected as the C&C communication based on the SSL/TLS protocol.
(1) A target host H to be a start point to estimate the infected range is selected.
(2) From monitoring target hosts (excluding the host H), in which SSL/TSL transactions determined as the C&C communication and C&C server address are recorded, a host group Inf(H), of which similarity with the target SSL/TLS transaction is at least a predetermined value or of which C&C server address is the same as the target host H, is extracted.
(3) The host group Inf(H) extracted in (2) is estimated as a host group Hm which is infected by a same type of malware as the malware infecting the host H. In other words, the host group Inf(H) is estimated as an infected range. Further, in order to estimate the infected range of individual malware $\alpha k$ infecting the target host H at the start point, the host group Inf(H) (=Inf(H|$\alpha k$)) is determined within the range of the C&C server address group and the C&C traffic group corresponding to the malware $\alpha k$.

Variant Forms

In the above described embodiment, the network monitoring apparatus 20 is connected to the monitoring port (mirror port) of the switch or the router, whereby the packets and frames transmitted/received by the node 90 are acquired (see FIG. 1). However, the network configuration described in the above embodiment is an example of carrying out the present disclosure, and other network configurations may be used to carry out the embodiments.

Figure 9:
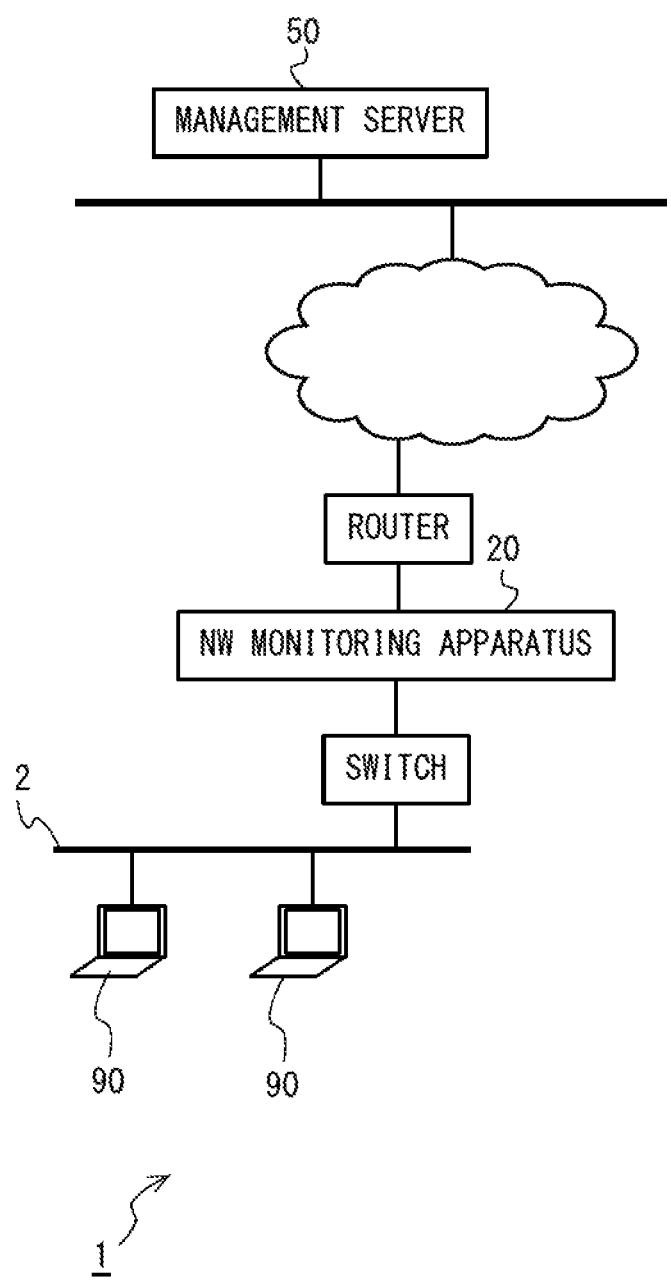
FIG. 9 is a schematic diagram depicting a variant form of the configuration of the system according to the embodiment.

For example, the network monitoring apparatus 20 may be simply connected to the network segment 2, instead of being connected to the monitoring port (mirror port), and in this case, the packets and frames transmitted/received by the node 90 can be acquired by acquiring the frames transmitted through the network segment 2, including the frames that are not address to the MAC address of this network monitoring apparatus 20. In this case as well, the network monitoring apparatus 20 may operate in the passive mode. Further, the network monitoring apparatus 20 may acquire the packets and frames transmitted over a network by being connected between the switch or the router of the network segment 2 and another switch or router located in the host device thereof (see FIG. 9). In this case, the network monitoring apparatus 20 operates in inline mode, where packets that need not be blocked, among the acquired packets, are transferred. The network monitoring apparatus 20 may be included in the router or the switch.

In this embodiment, the packets transmitted over a network are acquired, and the above-mentioned detection is performed by various detecting engines in real-time, but the application range of the present disclosure is not limited to real-time detection. For example, data on communication performed via the network may be stored, and the above-mentioned processing by various detecting engines may be performed on the stored data.

Effect

According to the embodiment described above, the distribution of the attribute information of communication with a same communication destination is calculated, and when the distribution satisfies a predetermined criterion, it is estimated that the detected communication is communication by a predetermined type of software (malware in this embodiment), thereby communication by the predetermined software such as malware, which disguises normal communication, can be detected.

For example, according to the embodiment described above, the structural similarity of communication to a certain communication destination is inspected, so that regularity of communication timings and bias of the communication data sizes are calculated when similar communications are continuously performed for a plurality of times exceeding a specified frequency, and C&C communication of malware can be detected. This is because, unlike the browser communication operated by a user, malware has a tendency to perform communication cyclically to a certain destination using the same data structure, and while malware waits for instructions from the cyber attacker, data sizes returned from the server side as a response tend to be approximately the same size.

Further, according to the embodiment described above, when a malware infection is detected at a certain terminal, the infected terminals in the system, which are performing similar communication as the C&C communication of this malware, can be estimated using the structural similarity of the communication as a feature value. This is because the same type of malwares have a characteristic to perform structurally similar communication.

Furthermore, according to the embodiment described above, when a malware infection is detected at a certain terminal, a malware family, that performs communication similar to the C&C communication of this malware, can be searched using a structural similarity of communication stored in a database as the feature value. This is because the same type of malwares have a characteristic to perform structurally similar communication.

What is claimed is:

1. An information processing apparatus comprising a memory and a processing circuitry coupled with the memory configured to execute:
    acquiring communication data generated by a terminal connected to a network;
    calculating, as distribution of attribute information of a plurality of communications with a same communication destination, a bias of data sizes of the plurality of communications with the same communication destination based on the acquired communication data; and estimating whether a detected communication is a communication by a predetermined type of software by determining whether the calculated distribution satisfies a predetermined criterion, with reference to the result of processing by the calculating.

2. The information processing apparatus according to claim 1, wherein the processing circuitry calculates the distribution of the attribute information for a plurality of communications excluding a communication of which data size is outside a predetermined range.

3. The information processing apparatus according to claim 2, wherein the processing circuitry calculates the distribution of data lengths of responses to a single communication destination.

4. The information processing apparatus according to claim 3, wherein the processing circuitry calculates the distribution of data lengths excluding header portions, of responses excluding a downloaded execution file, for each GET method or POST/PUT method to a single communication destination.

5. The information processing apparatus according to claim 3, wherein the processing circuitry calculates the distribution of data lengths of responses to a single communication destination, excluding responses having at least a predetermined size.

6. The information processing apparatus according to claim 1, the processing circuitry further executes:
   extracting a feature included in the acquired communication;
   comparing a plurality of communications with a same communication destination using the extracted feature; and
   calculating the similarity among the plurality of communications,
   wherein the processing circuitry calculates the distribution when at least a predetermined number of communications with a same communication destination of which similarity is at least a predetermined value are detected.

7. The information processing apparatus according to claim 6,
   wherein the processing circuitry extracts a feature for each element included in the acquired communication, and
   the processing circuitry calculates element similarities among the plurality of communications for each element, and weights the calculated element similarities for each element, to calculate a total similarity among the plurality of communications.

8. The information processing apparatus according to claim 7, wherein the processing circuitry calculates the element similarity based on commonality of features related to each element or a distance between combinations of features related to each element.

9. The information processing apparatus according to claim 7,
   wherein the processing circuitry extracts a feature of an arrangement order of request headers included in the plurality of communications, and
   the processing circuitry calculates the element similarity of the arrangement order of the request headers.

10. The information processing apparatus according to claim 6,
   wherein the processing circuitry further calculates a similarity between a first communication which is estimated as a communication by the predetermined type of software by the estimating, and a second communication by a second terminal, which is different from the terminal having performed the first communication, among the terminals connected to the network, and
   when the calculated similarity between the first communication and the second communication is at least a predetermined value, the processing circuitry estimates the second terminal as a terminal in which software belonging to the same group as the software in the first communication is operating.

11. The information processing apparatus according to claim 10, wherein when a ratio of the number of terminals which perform a communication of which similarity to the first communication is at least a predetermined value, with respect to the number of terminals managed by the information processing terminal, is at least a predetermined ratio, the processing circuitry negates the estimation that the first communication is a communication by the predetermined type of software.

12. The information processing apparatus according to claim 6,
   wherein the processing circuitry further calculates a similarity between a first communication which is estimated as a communication by the predetermined type of software by the estimating, and a known communication by a known software, and
   when the calculated similarity between the first communication and the known communication is at least a predetermined value, the processing circuitry estimates the first communication as a communication by a software belonging to the same group as the known software.

13. The information processing apparatus according to claim 1, wherein the processing circuitry determines whether the calculated distribution satisfies a determination criterion provided for a predetermined phase in a malware communication, to estimate whether the detected communication is a communication in the predetermined phase by malware.

14. A communication inspecting method for causing a computer to execute:
   acquiring communication data generated by a terminal connected to a network;
   calculating, as distribution of attribute information of a plurality of communications with a same communication destination, a bias of data sizes of the plurality of communications with the same communication destination based on the acquired communication data;
   estimating whether a detected communication is a communication by a predetermined type of software by determining whether the calculated distribution satisfies a predetermined criterion, with reference to the result of processing by the calculating.

15. A non-transitory computer-readable recording medium recorded with a program for causing a computer to execute:
   acquiring communication data generated by a terminal connected to a network;
   calculating, as distribution of attribute information of a plurality of communications with a same communication destination, a bias of data sizes of the plurality of communications with the same communication destination based on the acquired communication data; and estimating whether a detected communication is a communication by a predetermined type of software by determining whether the calculated distribution satisfies a predetermined criterion, with reference to the result of processing by the calculating.

\* \* \* \* \*